(12) United States Patent
Morris et al.

(10) Patent No.: US 8,882,461 B2
(45) Date of Patent: Nov. 11, 2014

(54) GAS TURBINE ENGINES WITH IMPROVED TRAILING EDGE COOLING ARRANGEMENTS

(75) Inventors: Mark C. Morris, Phoenix, AZ (US); Jon Kettinger, Litchfield Park, AZ (US); Yong-Qing Yang, Chandler, AZ (US); Daniel Cregg Crites, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 558 days.

(21) Appl. No.: 13/230,553

(22) Filed: Sep. 12, 2011

(65) Prior Publication Data
US 2013/0064639 A1   Mar. 14, 2013

(51) Int. Cl.
F01D 5/18 (2006.01)

(52) U.S. Cl.
CPC .......... F01D 5/187 (2013.01); F05D 2240/304 (2013.01); F05D 2260/22141 (2013.01); Y02T 50/673 (2013.01); F05D 2260/202 (2013.01); F05D 2250/185 (2013.01); Y02T 50/676 (2013.01)
USPC ...................................................... 416/97 R

(58) Field of Classification Search
CPC ..................... F01D 5/186; F01D 5/187; F05D 2260/22141; F05D 2260/2212
USPC .......................................... 415/115; 416/97 R
See application file for complete search history.

(56) References Cited

U.S. PATENT DOCUMENTS

| | | | |
|---|---|---|---|
| 3,809,494 A | 5/1974 | Redman | |
| 4,515,523 A | 5/1985 | North et al. | |
| 4,767,261 A | 8/1988 | Godfrey et al. | |
| 5,288,207 A * | 2/1994 | Linask | 416/97 R |
| 5,601,399 A | 2/1997 | Okpara et al. | |
| 5,772,397 A | 6/1998 | Morris et al. | |
| 5,857,837 A | 1/1999 | Zelesky et al. | |
| 6,234,754 B1 * | 5/2001 | Zelesky et al. | 416/97 R |
| 6,254,334 B1 | 7/2001 | LaFleur | |
| 6,402,470 B1 | 6/2002 | Kvasnak et al. | |
| 6,402,471 B1 | 6/2002 | Demers et al. | |
| 6,599,092 B1 | 7/2003 | Manning et al. | |
| 6,602,047 B1 | 8/2003 | Barreto et al. | |
| 6,607,355 B2 | 8/2003 | Cunha et al. | |
| 6,616,406 B2 | 9/2003 | Liang | |
| 6,929,451 B2 | 8/2005 | Gregg et al. | |
| 6,969,230 B2 * | 11/2005 | Shi et al. | 415/115 |
| 6,974,308 B2 | 12/2005 | Halfmann et al. | |
| 6,984,103 B2 | 1/2006 | Lee et al. | |
| 7,121,787 B2 * | 10/2006 | Jacks et al. | 415/115 |

(Continued)

Primary Examiner — Ninh H Nguyen
(74) Attorney, Agent, or Firm — Ingrassia Fisher & Lorenz, P.C.

(57) ABSTRACT

An airfoil is provided for a gas turbine engine. The airfoil includes a pressure side wall; a suction side wall; an internal cavity defined between the pressure side wall and the suction side wall for receiving cooling air; and a cooling arrangement within the internal cavity. The cooling arrangement includes a first land extending to a first downstream end aft of the pressure side trailing edge, a second land extending to a second downstream end aft of the pressure side trailing edge, the first land and second land defining a first slot, a first divider positioned radially in between the first land and the second land to define a first passageway of the first slot and a second passageway of the first slot, a first pin positioned upstream and indexed to the first passageway, and a second pin positioned upstream and indexed to the second passageway.

17 Claims, 4 Drawing Sheets

(56) References Cited

U.S. PATENT DOCUMENTS

| | | |
|---|---|---|
| 7,125,225 B2 * | 10/2006 | Surace et al. ............... 416/96 R |
| RE39,398 E | 11/2006 | Danowski et al. |
| 7,156,620 B2 | 1/2007 | Papple |
| 7,255,534 B2 | 8/2007 | Liang |
| 7,445,432 B2 | 11/2008 | Levine et al. |
| 7,575,414 B2 | 8/2009 | Lee |
| 7,731,481 B2 | 6/2010 | Cunha et al. |

* cited by examiner

GAS TURBINE ENGINES WITH IMPROVED TRAILING EDGE COOLING ARRANGEMENTS

STATEMENT REGARDING FEDERALLY SPONSORED RESEARCH OR DEVELOPMENT

This invention was made with Government support under W911W6-08-2-0011 awarded by the United States Army. The Government has certain rights in this invention.

TECHNICAL FIELD

The present invention generally relates to gas turbine engines, and more particularly relates to turbine airfoils with trailing edge cooling arrangements.

BACKGROUND

A gas turbine engine may be used to power various types of vehicles and systems, such as aircraft engines and auxiliary power units in aircraft. In a typical configuration, the turbines of such engines include rows of airfoils, such as stator vanes and rotor blades disposed in an alternating sequence along the axial length of a generally annular hot gas flow path. The rotor blades are mounted at the periphery of one or more rotor disks mounted on a main engine shaft. Hot combustion gases are delivered from an engine combustor to the annular hot gas flow path, thus resulting in rotary driving of the rotor disks and the main engine shaft to provide an engine output.

In most gas turbine engine applications, it is desirable to regulate the operating temperature of the engine components in order to prevent overheating and potential mechanical failures attributable thereto. For example, the airfoils of the turbines require such cooling, particularly at the trailing edge that is significantly hotter than the remainder of the airfoil. Elevated temperatures at the trailing edge may result in high thermal stress and oxidation, and thus limit the life of the airfoil. Accordingly, airfoils may be cooled using a source of relatively cool air, such as compressor discharge air, that flows through an internal cooling circuit within the airfoil and that exits through slots at the trailing edge. While these configurations may be effective, there remains a need for enhanced cooling of the trailing edges of turbine airfoils.

Accordingly, it is desirable to provide a gas turbine engine with turbine airfoils having improved cooling arrangements for the trailing edges. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an airfoil is provided for a gas turbine engine. The airfoil includes a pressure side wall having a pressure side trailing edge; a suction side wall coupled to the pressure side wall at a leading edge and having a suction side trailing edge, the suction side trailing edge and the pressure side trailing edge forming an airfoil trailing edge such that the airfoil extends in a chordwise direction between the leading edge and the airfoil trailing edge; an internal cavity defined between the pressure side wall and the suction side wall for receiving cooling air; and a cooling arrangement within the internal cavity. The cooling arrangement includes a first land extending in a circumferential direction between the suction side wall and the pressure side wall and in the chordwise direction from a first upstream end forward of the pressure side trailing edge to a first downstream end aft of the pressure side trailing edge, a second land extending in the circumferential direction between the suction side wall and the pressure side wall and in the chordwise direction from a second upstream end forward of the pressure side trailing edge to a second downstream end aft of the pressure side trailing edge, the first land and second land defining a first slot configured to direct the cooling air out of the internal cavity, at least one of a first divider positioned radially in between the first land and the second land to define a first passageway of the first slot and a second passageway of the first slot, a first pin positioned upstream of the first divider and indexed to the first passageway, and a second pin positioned upstream of the second divider and indexed to the second passageway.

In accordance with an exemplary embodiment, a cooling arrangement is provided for an airfoil having a pressure side wall with a pressure side trailing edge and a suction side wall with a suction side trailing edge. The cooling arrangement includes a first land extending in a circumferential direction between the suction side wall and the pressure side wall and in a chordwise direction from a first upstream end forward of the pressure side trailing edge to a first downstream end aft of the pressure side trailing edge; a second land extending in the circumferential direction between the suction side wall and the pressure side wall and in the chordwise direction from a second upstream end forward of the pressure side trailing edge to a second downstream end aft of the pressure side trailing edge, the first land and second land defining a first slot configured to direct the cooling air out of the internal cavity; at least one of a first divider positioned radially in between the first land and the second land to define a first passageway of the first slot and a second passageway of the first slot; a first pin positioned upstream of the first divider and indexed to the first passageway; and a second pin positioned upstream of the second divider and indexed to the second passageway.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein are directed to gas turbine engines with a turbine section having airfoil assemblies, particularly alternating rows of rotor assemblies and stator assemblies, each with airfoils disposed within the path of the hot combustion gases. The airfoil assemblies are cooled with cooling air that flows through internal passages and out of cooling slots at the trailing edges. The airfoil assemblies include trailing edge cooling arrangements with internal pins, dividers, and lands to enhance the cooling at the trailing edge. For example, each slot may be defined by lands that extend to the trailing edge. Dividers are placed radially in between the lands to meter the flow of cooling air through the slot and to equally distribute air across the trailing edge. Pins are indexed radially and in a chordwise direction with respect to the slots to accelerate the cooling air into the cooling slot and to further enhance the cooling film.

Figure 1:
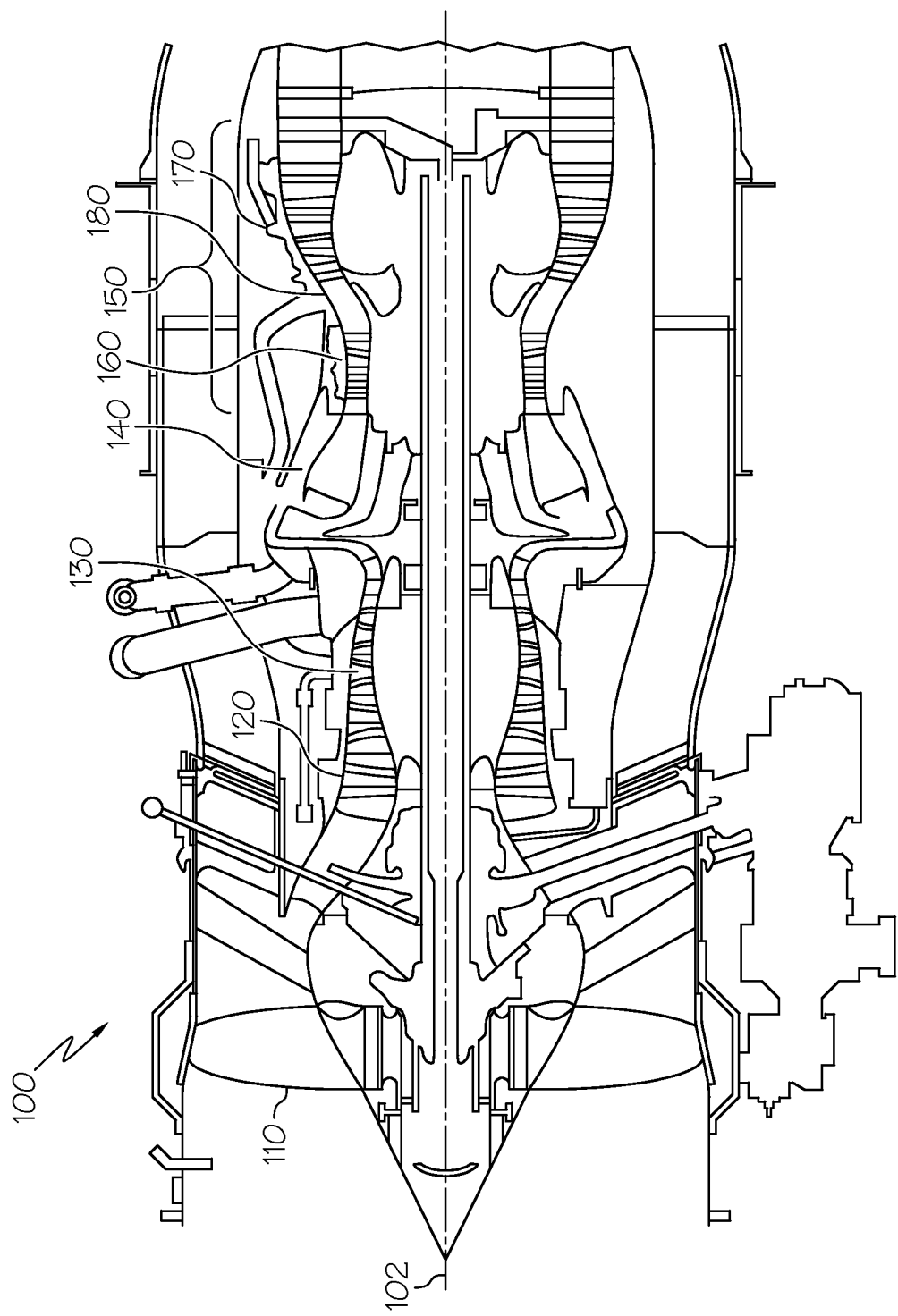
FIG. 1 is a schematic cross-sectional view of a gas turbine engine in accordance with an exemplary embodiment.

FIG. 1 a schematic cross-sectional view of a gas turbine engine 100 in accordance with an exemplary embodiment. As shown, the engine 100 may be an annular structure about a longitudinal or axial centerline axis 102. In the description that follows, the term "axial" refers broadly to a direction parallel to the axis 102 about which the rotating components of the engine 100 rotate. This axis 102 runs from the front of the engine 100 to the back of the engine 100. The term "radial" refers broadly to a direction that is perpendicular to the axis 102 and that points towards or away from the axis of the engine 100. A "circumferential" direction at a given point is a direction that is normal to the local radial direction and normal to the axial direction. An "upstream" direction refers to the direction from which the local flow is coming, while a "downstream" direction refers to the direction in which the local flow is traveling. In the most general sense, flow through the engine 100 tends to be from front to back (or forward to aft), so the "upstream direction" will generally refer to a forward direction, while a "downstream direction" will refer to a rearward or aft direction. A "chordwise" direction is generally a direction along an airfoil from leading edge to trailing edge along the chordline.

The engine 100 generally includes, in serial flow communication, a fan section 110, a low pressure compressor 120, a high pressure compressor 130, a combustor 140, and one or more turbines 150, such as a high pressure turbine 160 and a low pressure turbine 170. During operation, ambient air enters the engine 100 at the fan section 110, which directs the air into the compressors 120 and 130. The compressors 120 and 130 provide compressed air to the combustor 140 in which the compressed air is mixed with fuel and ignited to generate hot combustion gases. The compressors 120 and 130 may also provide cooling air to other portions of the engine 100, such as the cooling arrangements discussed below. The combustion gases from the combustor 140 pass through the high pressure turbine 160 and the low pressure turbine 170 via an inter-turbine duct 180.

The high pressure turbine 160 and low pressure turbine 170 provide thrust via the expulsion of the exhaust gases, mechanical power by rotating a shaft connected to one of the turbines 160 and 170, or a combination of thrust and mechanical power. As one embodiment, the engine 100 is a multi-spool engine in which the high pressure turbine 160 drives the high pressure compressor 130 and the low pressure turbine 170 drives the low pressure compressor 120 and fan section 110. In other embodiments, additional or fewer turbines, or different configurations, may be provided.

Figure 2:
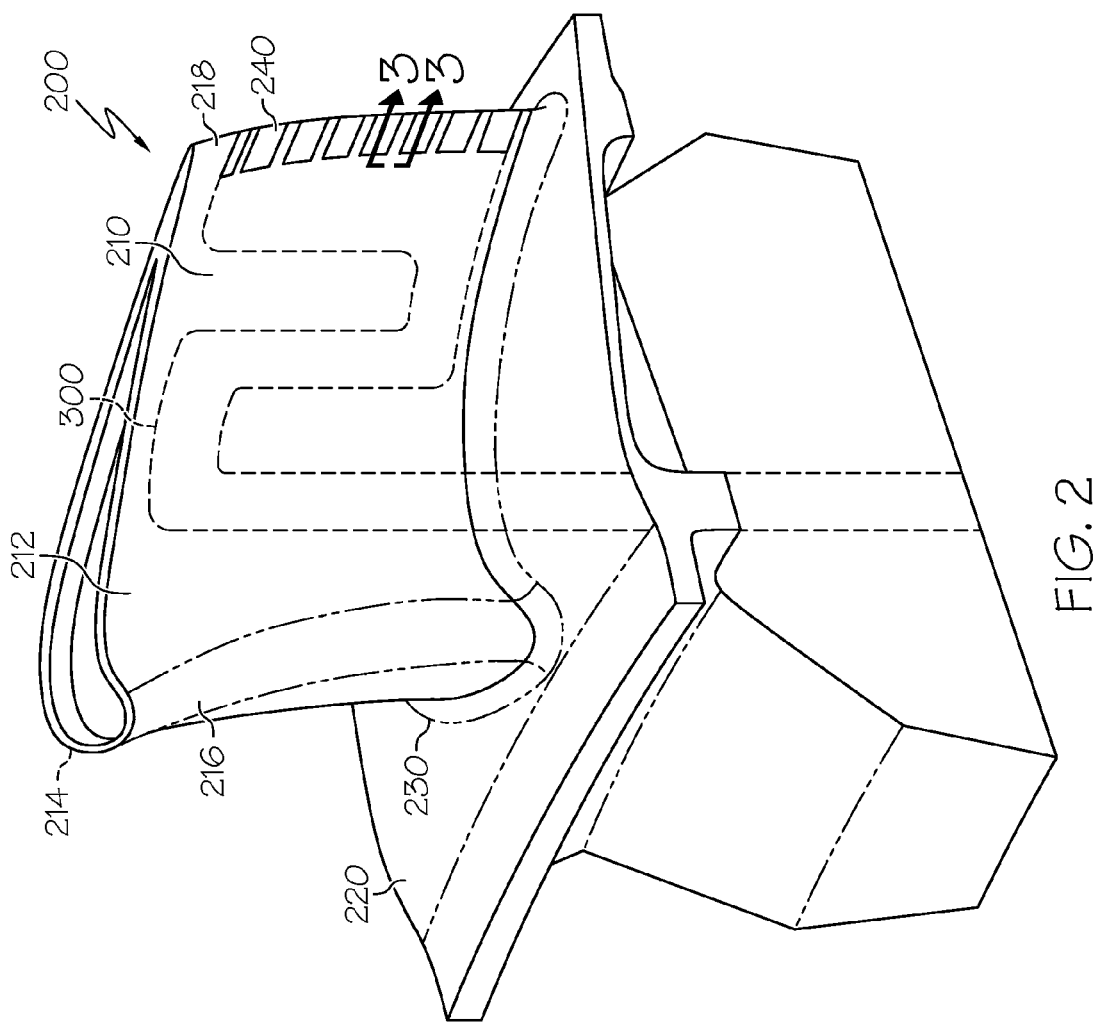
FIG. 2 is an isometric view of a turbine airfoil assembly of the gas turbine engine of FIG. 1 in accordance with an exemplary embodiment.

FIG. 2 is a cross-sectional view of a turbine airfoil assembly 200 of the engine 100 of FIG. 1 in accordance with an exemplary embodiment. With reference to FIG. 1, the turbine airfoil assembly 200 may be part of the high pressure turbine 160 or low pressure turbine 170. Although the turbine airfoil assembly 200 is depicted as a rotor component, the turbine airfoil assembly 200 may also be a stationary stator component.

Generally, the turbine airfoil assembly 200 includes an airfoil 210 mounted on a platform 220, which in turn is coupled to a root area 230. Each airfoil 210 includes a pressure side wall 212 and a suction side wall 214 extending between a leading edge 216 and a trailing edge 218. In this embodiment, the root area 230 may be mounted on a rotor disk (not shown), and the platform 220 is configured to radially contain airflow through the turbine. As noted above, during operation, the combustion gases from the combustor flow into the turbine and through circumferentially arranged rows of such airfoils 210.

Given the elevated temperatures of the combustion gases, the turbine airfoil assembly 200 is typically cooled. As described in greater detail below, the turbine airfoil assembly 200 may include an internal cooling circuit 300 (schematically shown in FIG. 2) through which cooling air is directed. Particularly, the cooling air may be bled from the compressor (e.g., compressor 120 or 130 of FIG. 1); flow through the internal cooling circuit 300; and exit through cooling slots 240 positioned on the trailing edge 218. The trailing edge 218 is a particular cooling challenge considering that it is generally aerodynamically advantageous to make the trailing edge 218 as thin as possible and the cooling air has increased in temperature by the time it has reached the trailing edge 218 at the end of the cooling circuit 300. In practice, there is a trade-off to use air from the compressor for cooling purposes. On the one hand, the lower temperature of the compressor air provides beneficial cooling that increases the durability of the turbine airfoil assembly 200. On the other hand, air bled off of the compressor does not generate the amount of work as it might otherwise within the core gas path and consequently decreases the efficiency of the engine. As such, the effectiveness of such cooling should be maximized. Additional details of the cooling circuit 300, particularly a cooling arrangement at the trailing edge 218, are provided below.

Figure 3:
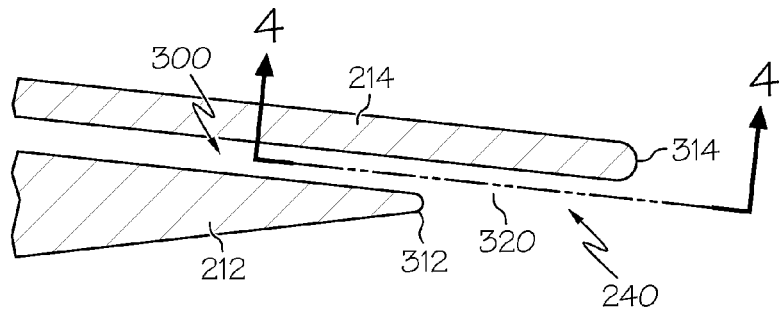
FIG. 3 is a partial cross-sectional view of a trailing edge of an airfoil of the turbine airfoil assembly of FIG. 2 in accordance with an exemplary embodiment.

FIG. 3 is a cross-sectional view of a portion of the airfoil 210 of FIG. 2 through line 3-3 in accordance with an exemplary embodiment. The view of FIG. 3 may be considered generally an axial-circumferential plane in the airfoil chordwise direction. In particular, FIG. 3 depicts a portion of the cooling circuit 300 at the trailing edge 218 through one of the cooling slots 240. As particularly shown in FIG. 3, the trailing edge 218 of the airfoil 210 is formed by a pressure side trailing edge 312 on the pressure side wall 212 and a suction side trailing edge 314 on the suction side wall 214. Moreover, the slot 240 is formed in the pressure side trailing edge 312 such that a portion of the interior surface 320 of the suction side wall 214 extends beyond the pressure side trailing edge 312. As shown in FIG. 3, the pressure side wall 212 and suction side wall 214 have a constant or tapering thickness to the lip of the respective edges 312 and 314. As noted above, such thicknesses are advantageous from an aerodynamics, structural, and weight perspective.

As will now be described in greater detail with reference to FIG. 4, the cooling circuit 300 of the turbine airfoil assembly 200 at the trailing edge 218 may have cooling arrangements that enable a more effective cooling of the trailing edge 218, particularly by providing a relatively constant film of cooling air on the interior surface 320 of suction side wall 214 at the slot 240.

Figure 4:
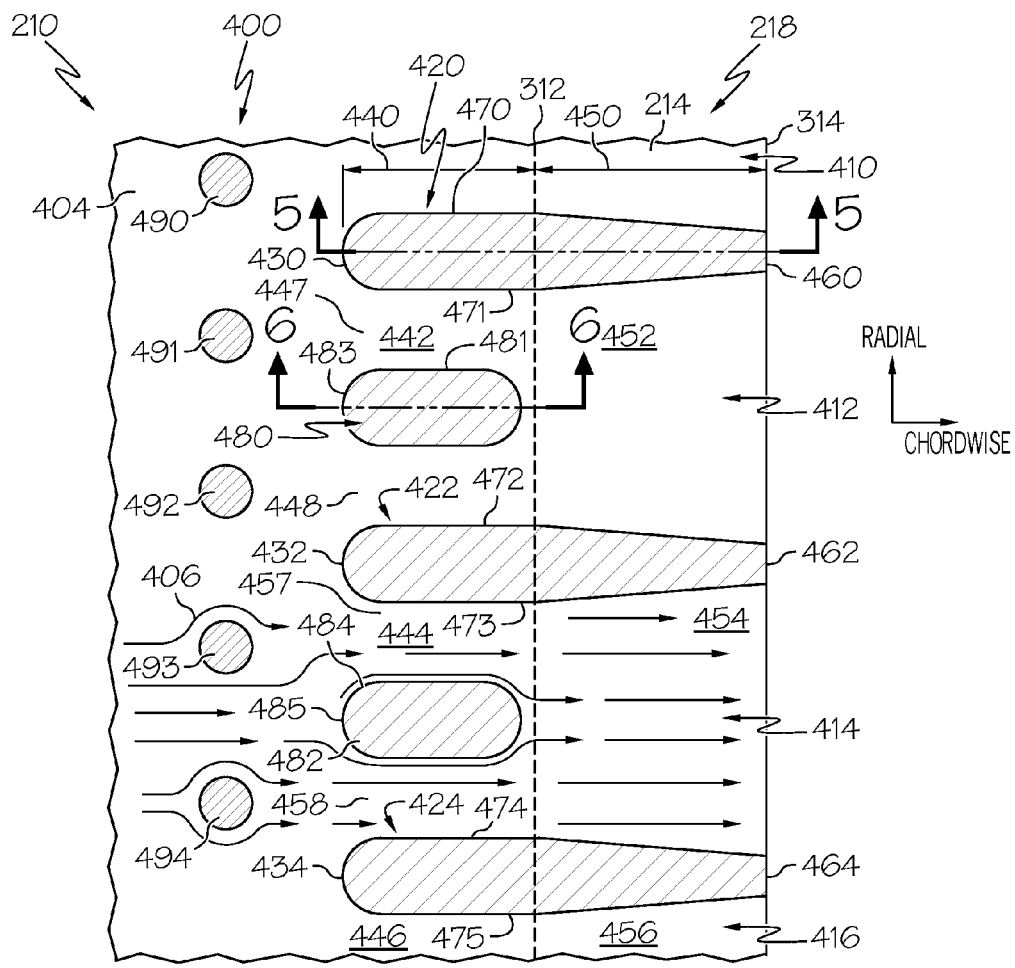
FIG. 4 is a cross-sectional view of the trailing edge of the airfoil of FIG. 3 through line 4-4 in accordance with an exemplary embodiment.

FIG. 4 is a partial cross-sectional view of the trailing edge 218 of the airfoil 210 of FIG. 3 through line 4-4 in accordance with an exemplary embodiment. The view of FIG. 4 may be considered generally a radial-chordwise plane. In particular, FIG. 4 depicts a cross-sectional view of a cooling arrangement 400 within an internal cavity 404 defined between the pressure side wall 212 (FIG. 3) and the suction side wall 214. Although the pressure side wall 212 is not visible in the view of FIG. 4, the position of the pressure side trailing edge 312 is schematically shown. As noted above, the trailing edge 218 of the airfoil 210 is formed by the pressure side trailing edge 312 and the suction side trailing edge 314. The termination point or lips at the pressure side trailing edge 312 and suction side trailing edge 314 are generally straight and extend in the radial direction.

The cooling arrangement 400 forms slots 410, 412, 414, and 416 (e.g., the slots generically referenced as slots 240 above) at the trailing edge 218. Portions of four slots 410, 412, 414, and 416 are shown in FIG. 4, and the configuration of such slots may continue along the radial length of the trailing edge 218 or the other portions of the trailing edge 218 may have different arrangements. As described below, the cooling arrangement 400 includes one or more lands 420, 422, and 424, one or more dividers 480 and 482, and one or more pins 490, 491, 492, 493, and 494.

Figure 5:
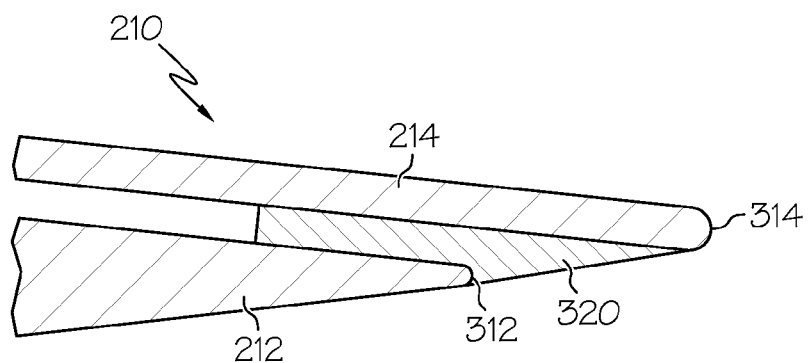
FIG. 5 is a cross-sectional view of a portion of the trailing edge of the airfoil of FIG. 4 through line 5-5 in accordance with an exemplary embodiment.

Each of the slots 410, 412, 414, and 416 is defined in the chordwise and radial directions by the lands 420, 422, and 424. For example, lands 420 and 422 define slot 412, and lands 422 and 424 define slot 414. In general, the lands 420, 422, and 424 extend in a radial direction between upstream ends 430, 432, and 434 and downstream ends 460, 462, and 464. Additionally, the lands 420, 422, and 424 extend in a circumferential direction between the suction side wall 214 and pressure side wall 212 (FIG. 3) to provide dimensional control of the trailing edge 218, or since the lands 420, 422, and 424 extend beyond the pressure side trailing edge 312, between the suction side wall 214 and co-planar to the curvature of the pressure side wall 212, such as shown in the cross-sectional view of FIG. 5. FIG. 5 is a view of land 420 through line 5-5 in FIG. 4 that extends aft of the pressure side trailing edge 312 to the trailing edge 314 of the suction side wall 214. In one exemplary embodiment, the lands 420, 422, and 424 do not taper radially or axially along a circumferential direction, although other cross-sectional arrangements are possible.

Referring again to FIG. 4, in one exemplary embodiment, each land 420, 422, and 424 has a cross-sectional arrangement with side walls 470, 471, 472, 473, 474, and 475 having generally parallel upstream portions and generally tapering downstream portions (e.g., radially tapering along the chordwise direction), although other cross-sectional shapes are possible. In one exemplary embodiment, the side walls 470-475 of the lands 420, 422, and 424 may be straight and begin tapering at or just downstream of the pressure side trailing edge 312. For example, the tapering may begin at a distance of one slot height (e.g., the distance between the pressure side wall 212 and the suction side wall 214 in the circumferential direction) downstream of the pressure side trailing edge 312.

Accordingly, each slot 410, 412, 414, and 416 extends in a chordwise direction from the upstream end 430, 432, and 434 of the lands 420, 422, and 424 to the suction side trailing edge 314. As such, each slot 410, 412, 414, and 416 may be considered to have an internal slot portion 440, 442, 444, and 446 and an external, slot exit portion 450, 452, 454, and 456. The internal slot portions 440, 442, 444, and 446 extend in a chordwise direction between the upstream ends 430, 432, and 434 of the lands 420, 422, and 424 to the pressure side trailing edge 312, and the slot exit portions 450, 452, 454, and 456 extend between the pressure side trailing edge 312 and the suction side trailing edge 314.

The dividers 480 and 482 are positioned radially between the lands 420, 422, and 424 within the slots 410, 412, 414, and 416. For example, divider 480 is positioned within slot 412 between land 420 and land 422, and divider 482 is positioned within slot 414 between land 422 and land 424. As such, the dividers 480 and 482 may be considered to divide each of the internal slot portions 440, 442, 444, and 446 into a first passageway 447 and 457 and a second passageway 448 and 458. For example, the divider 480 divides the internal slot portion 442 into a first passageway 447 and a second passageway 448.

Generally, the dividers 480 and 482 extend in a circumferential direction between the pressure side wall 212 (FIG. 2) and the suction side wall 214 to provide dimensional control of the trailing edge 218. In one embodiment, the dividers 480 and 482 may begin at the same chordwise location as the upstream end 430, 432, and 434 of the lands 420, 422, and 424. In a chordwise direction, the dividers 480 and 482 extend between the upstream end 430, 432, and 434 of the lands 420, 422, and 424 to a position forward of the pressure side trailing edge 312. As such, the dividers 480 and 482 are typically positioned completely within the internal slot portions 440, 442, 444, and 446. In other embodiments, the dividers 480 and 482 may begin at a chordwise location that is upstream or downstream from the upstream end 430, 432, and 434 of the lands 420, 422, and 424. As shown in the cross-sectional view of FIG. 4, the dividers 480 and 482 may have elongated side walls 481 and 484 and rounded end walls 483 and 485. Typically, at least a portion of the side walls 481 and 484 are straight and parallel to the chordwise direction.

The pins 490, 491, 492, 493, and 494 are positioned in a position forward of the slots 410, 412, 414, and 416. The pins 490-494 generally extend in a circumferential direction between the pressure side wall 212 (FIG. 2) and the suction side wall 214 to provide enhanced cooling and dimensional control of the trailing edge 218. As shown in the cross-sectional view of FIG. 4, the pins 490-494 may be circular, although other configurations may be provided. The pins 490-494 are radially indexed and chordwise positioned relative to the slots 410, 412, 414, and 416. Particularly, the pins 490-494 are aligned with respect to the first and second passageways 447, 448, 457, and 458. For example, pin 491 is aligned with first passageway 447 of slot 412, and adjacent pins 491 and 492 are radially centered with respect to divider 480. Positioning of the pins 490-494 are located upstream of flow divider leading edge 483, 485 to accelerate cooling flow 406 into slots 440, 442, 444 and 446 and to suppress vortices emanating around rounded end walls 483, 485 and upstream ends 430, 432, and 434 and walls 481, 484 and side walls 470, 471, 472, 473, 474, and 475. Positioning of pins 490-494 may be accomplished by computational fluid dynamics (CFD) analysis or experiment to obtain the desired flow field for cooling air 406.

Figure 6:
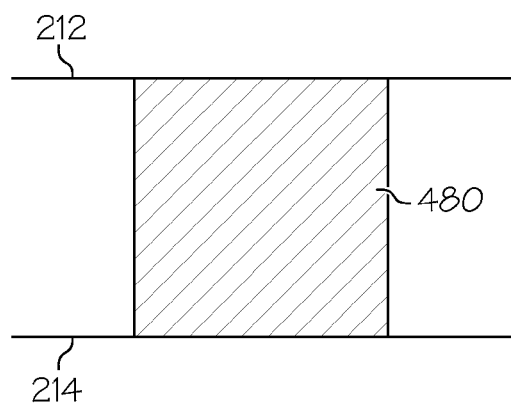
FIG. 6 is a cross-sectional view of a portion of the trailing edge of FIG. 4 through line 6-6 in accordance with a first exemplary embodiment.
Figure 7:
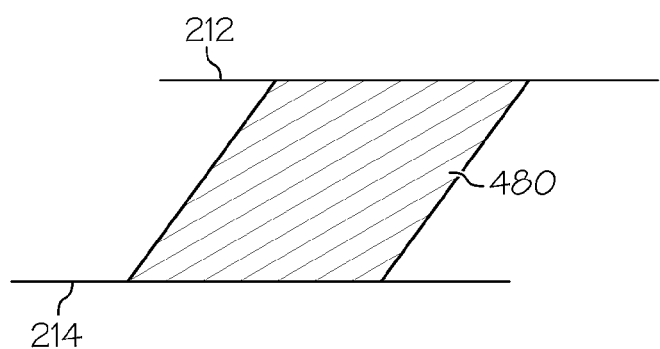
FIG. 7 is a partial cross-sectional view of a portion of the trailing edge of FIG. 4 through line 6-6 in accordance with a second exemplary embodiment.

In one exemplary embodiment, the dividers 480 and 482 are generally parallel to the circumferential direction, as shown for example in FIG. 6. FIG. 6 is a cross-sectional view of divider 480 through line 6-6 of FIG. 4 in accordance with a first exemplary embodiment. In other embodiments, the dividers 480 and 482 may be angled relative to the circumferential direction, as shown for example in FIG. 7. FIG. 7 is a cross-sectional view of divider 480 through line 6-6 of FIG. 4 in accordance with a second exemplary embodiment. The shape, dimensions, number, and position of the dividers 480 and 482 may be altered to suit a particular application.

Now that the cooling arrangement 400 has been generally described, a description of the airflow characteristics will be provided. The internal cavity 404 is fluidly coupled to the cooling circuit 300 and receives cooling air 406 flowing through the airfoil 200 (FIG. 2). In one exemplary embodiment, the cooling air 406 flows generally evenly through the cooling arrangement 400 within the internal cavity 404 and out of the slots 410, 412, 414, and 416. However, in the view of FIG. 4, arrows representing the cooling air 406 are only depicted with respect to slot 414 for clarity.

During operation, the cooling air 406 received within the internal cavity 404 flows around the pins 490-494 and into the slots 410, 412, 414, and 416. The cooling air 406 is metered through the slots 410, 412, 414, and 416 by the dividers 480 and 482. The dividers 480 and 482 are shaped to induce a Coanda effect around the dividers 480 and 482. In other words, the cooling air 406 tends to follow the surface of the dividers 480 and 482 such that the cooling air 406 covers the area downstream of the dividers 480 and 482, e.g., to prevent gaps in the cooling coverage of the cooling air 406 in the areas downstream of the dividers 480 and 482. The Coanda effect is enhanced by the curved upstream and downstream ends of the dividers 480 and 482. Additionally, the relatively straight side walls (e.g., parallel to the chordwise direction) enable the flow of cooling air 406 to flow around the upstream ends of the dividers 480 and 482, straighten out by generally following the surface of the dividers 480 and 482, and subsequently transitioning around the downstream ends of the dividers 480 and 482 into the areas downstream of the dividers 480 and 482. The dividers 480 and 482 terminate upstream of the pressure side trailing edge 312 such that the cooling air 406 diffuses radially within the slots 410, 412, 414, and 416 prior to the slot exit portions 450, 452, 454, and 456 to reduce or eliminate flow separation on the interior surface 320 of the suction side wall 214. As a result, the cooling air 406 forms a consistent film of cooling air to protect the trailing edge 218, particularly the interior surface 320 of the suction side wall 214 that would otherwise be exposed to hot combustion gases.

As noted above, the lands 420, 422, and 424 extend in the chordwise direction to the suction side trailing edge 314. As such, the top surface (e.g., the top circumferential surface shown in FIG. 5) of the lands 420, 422, and 424 are typically exposed to the hot combustion gases and are not cooled by the cooling air 406. However, as noted above, each land 420, 422, and 424 may have generally tapering downstream portions (e.g., radially tapering along the chordwise direction), thereby reducing the exposed areas. Additionally, the use of the dividers 480 and 482 enables a metered flow of cooling air 406 and structural stability at the trailing edge 218 without necessitating additional lands, which would otherwise result in more uncooled areas. As an example, in the embodiment of FIG. 4, the dividers 480 and 482 reduce the exposed land area by about 50%.

In the embodiment of FIG. 4, one divider 480 and 482 is positioned between adjacent lands 420, 422, and 424. However, in further embodiments, two or more dividers may be positioned between adjacent lands, thereby further reducing the number of lands. The number of dividers between adjacent lands may be determined, for example, by CFD analysis or experiment.

The cooling air 406 flows smoothly around the dividers 480 and 482 so as not to mix with the combustion gases. The thickness of the dividers 480 and 482 may be adjusted for metering the flow and casting limitations, to minimize blockage, and to help coalesce the flow. The dividers 480 and 482, as shown, have generally parallel side walls, although in other embodiments, the side walls may taper in a downstream direction. Generally, however, the dividers 480 and 482 will have at least a portion of parallel side walls to robustly meter the cooling air 406.

As noted above, the side walls 470-475 of the lands 420, 422, and 424 may have parallel and tapered portions. The lands 420, 422, and 424 extend straight for several slot widths before beginning to taper, which may minimize the vorticity produced at the side walls 470-475. As such, the cooling arrangement 400 of FIG. 4 only tapers in one direction (e.g., radially in the downstream direction), thereby limiting diffusion of the cooling air 406 in the radial-chordwise plane and enhancing the film attachment on the interior surface 320 of the suction side wall 214.

Additionally, some of the pins, dividers, and lands may be configured for additional vortex suppression. For example, arrangements of the dividers 480, 482, such as divider 480 in FIG. 7, may provide beneficial vortex suppression. In the embodiment of FIG. 7, the circumferential angle of the divider 480 may more smoothly direct air around the divider 480 to reduce turbulence and undesirable mixing. Further parameters and/or modifications of the cooling arrangement 400 may be based, for example, on CFD analysis for a given airfoil size, Mach number (e.g., sub-sonic, transonic, or supersonic applications), cooling flow rate, cooling flow and combustion gas temperatures, and the like.

As such, exemplary cooling arrangements and methods of cooling with such cooling arrangements enable a more uniform cooling film to result in improved cooling of the trailing edge. Particularly, the cooling arrangement enables the trailing edge to have a reduced thickness, thereby enhancing the aerodynamics of the airfoil. Additionally, because of the simplicity of the design, the cooling arrangement disclosed herein can be readily incorporated on new design engines or it can be economically retrofitted on existing engines. Exemplary embodiments discussed herein may enable higher turbine engine temperatures than conventional engines, which may result in an improvement in specific fuel consumption. Alternatively, exemplary embodiments may improve durability at current temperatures. In general, the gas turbine engine assemblies produced according to exemplary embodiments may find beneficial use in many industries including aerospace, but also including industrial applications such as electricity generation, naval propulsion, pumping sets for gas and oil transmission, aircraft and/or spacecraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An airfoil for a gas turbine engine, comprising:
   a pressure side wall having a pressure side trailing edge;
   a suction side wall coupled to the pressure side wall at a leading edge and having a suction side trailing edge, the suction side trailing edge and the pressure side trailing edge forming an airfoil trailing edge such that the airfoil extends in a chordwise direction between the leading edge and the airfoil trailing edge;
   an internal cavity defined between the pressure side wall and the suction side wall for receiving cooling air; and
   a cooling arrangement within the internal cavity, the cooling arrangement comprising:
      a first land extending in a circumferential direction between the suction side wall and the pressure side wall and in the chordwise direction from a first upstream end forward of the pressure side trailing edge to a first downstream end aft of the pressure side trailing edge,
      a second land extending in the circumferential direction between the suction side wall and the pressure side wall and in the chordwise direction from a second upstream end forward of the pressure side trailing edge to a second downstream end aft of the pressure side trailing edge, the first land and second land defining a first slot configured to direct the cooling air out of the internal cavity,
      at least one of a first divider positioned radially in between the first land and the second land to define a first passageway of the first slot and a second passageway of the first slot, wherein the first divider extends in the chordwise direction from a first end to a second end, the second end being positioned forward of the pressure side trailing edge relative to the chordwise direction,
      a first pin positioned upstream of the first divider and indexed to the first passageway, and
      a second pin positioned upstream of the first divider and indexed to the second passageway.

2. The airfoil of claim 1, wherein the pressure side trailing edge is generally straight in a radial direction.

3. The airfoil of claim 1, wherein the suction side trailing edge has a tapered thickness in the chordwise direction.

4. The airfoil of claim 1 wherein each of the first land and the second land is radially tapered in the chordwise direction.

5. The airfoil of claim 1, wherein the first divider has generally straight walls extending in the chordwise direction.

6. The airfoil of claim 1, wherein the first divider is shaped to induce a Coanda effect with the cooling air.

7. The airfoil of claim 1, wherein the first divider leading edge is normal to the flow direction in a radial-chordwise plane.

8. The airfoil of claim 1, wherein the first land and the second land extend to the suction side trailing edge.

9. The airfoil of claim 1, wherein the cooling arrangement further comprises:
   a third land extending in the circumferential direction between the suction side wall and the pressure side wall and in the chordwise direction from a third upstream end forward of the pressure side trailing edge to a third downstream end aft of the pressure side trailing edge, the third land and the second land defining a second slot configured to direct the cooling air out of the internal cavity.

10. The airfoil of claim 9, wherein the cooling arrangement further comprises:
    at least one of a second divider positioned radially in between the second land and the third land to define a third passageway and a fourth passageway.

11. An airfoil for a gas turbine engine, comprising:
    a pressure side wall having a pressure side trailing edge;
    a suction side wall coupled to the pressure side wall at a leading edge and having a suction side trailing edge, the suction side trailing edge and the pressure side trailing edge forming an airfoil trailing edge such that the airfoil extends in a chordwise direction between the leading edge and the airfoil trailing edge;
    an internal cavity defined between the pressure side wall and the suction side wall for receiving cooling air; and
    a cooling arrangement within the internal cavity, the cooling arrangement comprising:
       a first land extending in a circumferential direction between the suction side wall and the pressure side wall and in the chordwise direction from a first upstream end forward of the pressure side trailing edge to a first downstream end aft of the pressure side trailing edge,
       a second land extending in the circumferential direction between the suction side wall and the pressure side wall and in the chordwise direction from a second upstream end forward of the pressure side trailing edge to a second downstream end aft of the pressure side trailing edge, the first land and second land defining a first slot configured to direct the cooling air out of the internal cavity,
       at least one of a first divider positioned radially in between the first land and the second land to define a first passageway of the first slot and a second passageway of the first slot,
       a first pin positioned upstream of the first divider and indexed to the first passageway, and
       a second pin positioned upstream of the first divider and indexed to the second passageway,
    wherein the first divider is angled with respect to the circumferential direction.

12. A cooling arrangement for an airfoil having a pressure side wall with a pressure side trailing edge and a suction side wall with a suction side trailing edge, the cooling arrangement comprising:
    a first land extending in a circumferential direction between the suction side wall and the pressure side wall and in a chordwise direction from a first upstream end forward of the pressure side trailing edge to a first downstream end aft of the pressure side trailing edge;
    a second land extending in the circumferential direction between the suction side wall and the pressure side wall and in the chordwise direction from a second upstream end forward of the pressure side trailing edge to a second downstream end aft of the pressure side trailing edge, the first land and second land defining a first slot configured to direct the cooling air out of the internal cavity;
    at least one of a first divider positioned radially in between the first land and the second land to define a first passageway of the first slot and a second passageway of the first slot, wherein the first divider extends in the chordwise direction from a first end to a second end, the second end being positioned forward of the pressure side trailing edge relative to the chordwise direction;
    a first pin positioned upstream of the first divider and indexed to the first passageway; and a second pin positioned upstream of the first divider and indexed to the second passageway.

13. The cooling arrangement of claim 12, wherein the pressure side trailing edge is generally straight in a radial direction.

14. The cooling arrangement of claim 12, wherein the suction side trailing edge has a constant thickness in the chordwise direction.

15. The cooling arrangement of claim 12 wherein each of the first land and the second land is radially tapered in the chordwise direction.

16. The cooling arrangement of claim 12, wherein the first divider has generally straight walls extending in the chordwise direction.

17. The cooling arrangement of claim 12, wherein the first divider is shaped to induce a Coanda effect with the cooling air.

* * * * *